US008156694B2

(12) United States Patent
Knight, III et al.

(10) Patent No.: US 8,156,694 B2
(45) Date of Patent: Apr. 17, 2012

(54) SUPPORT PEDESTAL FOR SUPPORTING AN ELEVATED BUILDING SURFACE

(75) Inventors: Stephen J. Knight, III, Littleton, CO (US); William E. Kugler, Denver, CO (US)

(73) Assignee: United Construction Products, Inc., Denver, CO (US)

( * ) Notice: Subject to any disclaimer, the term of this patent is extended or adjusted under 35 U.S.C. 154(b) by 251 days.

(21) Appl. No.: 12/533,267

(22) Filed: Jul. 31, 2009

(65) Prior Publication Data

US 2011/0023385 A1 Feb. 3, 2011

(51) Int. Cl.

| | |
|---|---|
| ***E04B 9/00*** | (2006.01) |
| ***E04B 5/00*** | (2006.01) |
| ***E04G 1/22*** | (2006.01) |
| ***E04G 25/00*** | (2006.01) |
| ***B66F 7/14*** | (2006.01) |
| ***B66F 3/08*** | (2006.01) |
| ***E02D 29/00*** | (2006.01) |
| ***E02D 5/00*** | (2006.01) |
| ***F16M 11/20*** | (2006.01) |
| ***F16M 11/24*** | (2006.01) |
| ***A47F 5/00*** | (2006.01) |

(52) U.S. Cl. ..................... 52/126.6; 52/126.5; 52/126.7; 52/263; 52/632; 254/92; 254/93 A; 254/98; 405/288; 405/290; 405/230; 248/188.1; 248/188.4; 248/354.1; 248/354.3

(58) Field of Classification Search ...... 52/126.5–126.7, 52/263, 632; 254/92, 93 A, 98, 103, 133 R, 254/134; 405/288, 290, 230; 248/188.1, 248/188.2, 188.4, 354.1, 354.5, 354.6, 354.3

See application file for complete search history.

(56) References Cited

U.S. PATENT DOCUMENTS

| | | | | |
|---|---|---|---|---|
| 2,665,104 | A | 1/1954 | Myers | |
| 3,398,933 | A | 8/1968 | Haroldson | |
| 4,239,419 | A * | 12/1980 | Gillen, Jr. | 405/232 |
| 4,758,023 | A | 7/1988 | Vermillion | |

(Continued)

FOREIGN PATENT DOCUMENTS

EP 0373088 A1 6/1990

OTHER PUBLICATIONS

International Search Report and the Written Opinion of the International Searching Authority for PCT/US2010/044121 dated Nov. 1, 2010.

(Continued)

*Primary Examiner* — Brian Glessner
*Assistant Examiner* — Omar Hijaz
(74) *Attorney, Agent, or Firm* — Marsh Fischmann & Breyfogle LLP

(57) ABSTRACT

A method and device for supporting a structure above a fixed surface. The device can include a support pedestal whose height is adjustable through a range of heights without a substantial gap in the obtainable heights. In one embodiment, the support pedestal can include a base member, a support member and a coupling member operatively connecting the base member and the support member. The coupling member can include first and second cylindrical walls, whereby an outer wall of the coupling member bears directly on an outer wall of the base member. Locking members can be utilized to operatively attach the coupling member to at least one of the base member or the support member. The locking members can function to increase the structural stability of support pedestal.

32 Claims, 10 Drawing Sheets

U.S. PATENT DOCUMENTS

| | | | | |
|---|---|---|---|---|
| 5,116,004 | A | 5/1992 | Luecke | |
| 5,462,311 | A * | 10/1995 | Cipolla | 285/7 |
| 5,511,760 | A | 4/1996 | Kambara | |
| 5,588,264 | A | 12/1996 | Buzon | |
| 6,332,292 | B1 | 12/2001 | Buzon | |
| 6,363,685 | B1 | 4/2002 | Kugler | |
| 6,413,004 | B1 * | 7/2002 | Lin | 403/176 |
| 6,854,919 | B2 * | 2/2005 | Neumann et al. | 403/326 |
| 6,983,570 | B2 | 1/2006 | Mead | |
| 7,024,743 | B2 | 4/2006 | Heaton | |
| 7,918,059 | B2 * | 4/2011 | Repasky | 52/263 |
| 2002/0148173 | A1 | 10/2002 | Kugler | |
| 2003/0070372 | A1 * | 4/2003 | Favero | 52/220.1 |
| 2004/0035064 | A1 | 2/2004 | Kugler et al. | |
| 2004/0211147 | A1 * | 10/2004 | Vanagan | 52/720.1 |
| 2004/0261329 | A1 | 12/2004 | Kugler et al. | |
| 2008/0184652 | A1 * | 8/2008 | Kodi | 52/649.1 |
| 2009/0183442 | A1 | 7/2009 | Repasky | |
| 2009/0188189 | A1 | 7/2009 | Repasky | |
| 2010/0051763 | A1 | 3/2010 | Knight, III et al. | |
| 2011/0011012 | A1 | 1/2011 | Knight, III et al. | |
| 2011/0016809 | A1 | 1/2011 | Knight, III et al. | |

OTHER PUBLICATIONS

Brochure entitled Bison Screwjack B Series Pedestals, Bison Deck Supports, a United Construction Products, Inc. Company, dated Sep. 30, 2005.

Brochure entitled Bison ScrewJack Specification, Bison Screwjack Co., a division of United Construction Products, Inc., dated 2003.

Brochure entitled VersiJack 75, Elmich, dated May 2007.

Eternoivica Catalogue Price List, pp. 58-67, dated 2008.

Brochure entitled New Hanover Elevator Pedestal System, Hanover Architectural Products, dated 2007.

Brochure entitled Paver Supports, Waterproofing Systems Ltd., dated Jun. 2007.

* cited by examiner

SUPPORT PEDESTAL FOR SUPPORTING AN ELEVATED BUILDING SURFACE

BACKGROUND OF THE INVENTION

1. Field of the Invention

This invention relates to the field of support pedestals for supporting an elevated surface above a fixed surface, such as for elevated floors, decks and walkways.

2. Description of Related Art

Elevated building surfaces such as elevated floors, decks, terraces and walkways are desirable in many environments. One common system for creating such surfaces includes a plurality of surface tiles, such as concrete tiles (pavers), stone tiles or wood tiles, and a plurality of spaced-apart support pedestals upon which the tiles are placed to be supported above a fixed surface. For example, in outdoor applications, the surface tiles may be elevated above a fixed surface by the support pedestals to promote drainage, to provide a level structural surface for walking, and/or to prevent deterioration of or damage to the surface tiles forming the building surface. The support pedestals can have a fixed height, or can have an adjustable height such as to accommodate variations in the contour of the fixed surface upon which the support pedestals are placed and/or to create desirable architectural features.

In many applications, the surface tiles are rectangular in shape, having four corners. Each of the spaced-apart support pedestals can therefore support the corners of four adjacent surface tiles at the tile corners. Stated another way, each surface tile can be supported by portions of four support pedestals that are disposed under each of the four corners of the tile.

One example of a support pedestal is disclosed in U.S. Pat. No. 5,588,264 by Buzon, which incorporated herein by reference in its entirety. The support pedestal disclosed by Buzon can be used in outdoor or indoor environments and is capable of supporting heavy loads applied by many types of building surfaces. The support pedestal includes a threaded base member and a threaded support member that is rotatably engaged with the base member to enable the height of the support pedestal to be adjusted by rotating the support member or the base member relative to the other. The support pedestal can also include a coupler member that can couple the base member to the support member for further increasing the height of the support pedestal, if necessary.

Support pedestals are also disclosed in U.S. Pat. No. 6,363,685 by Kugler and U.S. Patent Publication No. 2004/0261329 by Kugler et al., each of which is incorporated herein by reference in its entirety.

SUMMARY OF THE INVENTION

Many elevated building surface assemblies using support pedestals require the use of many pedestals of varying heights to accommodate variations in the fixed surface upon which the pedestals are placed, and/or to create architectural features in the elevated building surface. Most adjustable-height pedestals are designed to reach a specific maximum height. Once this height is reached, and additional height is needed, it is important for a builder or contractor to be able to quickly and safely extend the height of the pedestal through the use of couplers.

Coupler members such as the coupler member disclosed in U.S. Pat. No. 5,588,264 can be used to increase the useful height of a support pedestal; however, one deficiency of threadably attached couplers is that the strength of the support pedestal and coupler(s) is dependent on the number of threads in mutual engagement in the pedestal as a whole. A second deficiency of threadably attached couplers is the time required for a builder to adequately engage the threads of the coupler with the threads of additional couplers and with the threads of the pedestal. A third deficiency of threadably attached couplers is that there are sometimes gaps in the height adjustment range that require the use of different pedestals to achieve a specific height.

Accordingly, it is one objective to provide a height-adjustable support pedestal having a coupling member for increasing the height of the support pedestal wherein the outer wall of the coupling member bears directly on the outer wall of the base member of the support pedestal so that the weight bearing capacity of the coupler and pedestal is not dependent on the amount of thread engagement.

For higher pedestal heights, it is another objective to provide a support pedestal having multiple coupling members wherein a coupling member bears directly on the outer wall of another coupling member to eliminate the dependency of the weight bearing capacity of the couplers and pedestal on the amount of thread engagement.

It is another objective to provide a coupling member to couple threaded pedestal members and increase the height of the pedestal member, that is adapted to continuously align and synchronize the threads of the coupling member and the one or more other pedestal members to eliminate gaps in the thread continuity where needed.

It is another objective to provide a coupling member that is easy and rapid for a builder to attach to a height-adjustable pedestal without the time required for threadable attachment.

Any one or more of these objectives may be met in accordance with one or more of the various embodiments disclosed herein. In one embodiment, a support pedestal for supporting an object above a surface and having an adjustable height comprises a first pedestal member, a second pedestal member and a coupling member operatively coupling the first pedestal member to the second pedestal member. The first pedestal member may include a first plate and a first cylindrical extension extending away from the first plate, where the first cylindrical extension includes a first cylindrical extension wall having an inner surface and an outer surface, the inner surface defining a first pedestal member bore. First pedestal member threads may be disposed on the outer surface of the first cylindrical extension wall.

The second pedestal member may include a second plate and a second cylindrical extension extending away from the second plate, where the second cylindrical extension includes a second cylindrical extension wall having an inner surface and an outer surface, where the inner surface defines a second pedestal member bore. Second pedestal member threads may be disposed on the inner surface on the second cylindrical extension wall.

The coupling member may include a first cylindrical engagement portion and a second cylindrical engagement portion. The first cylindrical engagement portion may include a first cylindrical engagement portion wall having an inner surface and an outer surface. The first cylindrical engagement portion may be inserted into the first pedestal member bore. The second cylindrical engagement portion may include a second cylindrical engagement portion wall having an inner surface and an outer surface and can include coupling member threads disposed on the outer surface. The coupling member threads may be rotatably engaged with the second pedestal member threads to couple the second pedestal member to the first pedestal member.

The coupling member threads may also be operatively synchronized with the first pedestal member threads to form a substantially continuous and uniform threaded surface. In this regard, a first locking member may be disposed on the inner surface of the first cylindrical extension wall and a second locking member may be disposed on the first cylindrical engagement portion of the coupling member. The first locking member and the second locking member can cooperate to operatively synchronize the first pedestal member threads with the coupling member threads when the first cylindrical engagement portion is fully inserted into the first pedestal member bore.

A number of feature refinements and additional features may be separately applicable to the foregoing embodiment. These feature refinements and additional features may be implemented individually or in any combination. For example, in one aspect, the first locking member may include at least one elongated rib and the second locking member may include at least one elongated slot. The rib may be adapted to slidably engage within the slot when the first cylindrical engagement portion is inserted into the first pedestal member bore, and the rib may ensure that the coupling member can only be inserted into the first pedestal member bore in a position that synchronizes the coupler member threads with the first pedestal member threads. The rib and slot may also prevent rotation of the first pedestal member relative to the coupling member once the coupling member is inserted.

In another aspect, the first locking member can include a tab aperture and the second locking member can include a resilient tab member. The tab member may be adapted to engage the tab aperture when the first cylindrical engagement portion is inserted into the first pedestal member bore in a position to operatively synchronize the first pedestal member threads with the coupling member threads. The tab member and tab aperture may also prevent rotation of the first pedestal member relative to the coupling member. In one variation, the first locking member and the second locking member may be further adapted to inhibit axial movement of the coupling member relative to the first pedestal member when the first cylindrical engagement portion is inserted into the first pedestal member bore. According to another variation, the first locking member may include a pair of elongated ribs forming at least one track between the ribs, where the resilient tab member is adapted to slidably engage within the track when the first cylindrical engagement portion is inserted into the first pedestal member bore.

According to another aspect, the support pedestal may further include a third locking member that is disposed on the first cylindrical extension wall and a fourth locking member that is disposed on the first cylindrical engagement portion of the coupling member. Additional locking members can enhance the stability of the support pedestal. In one variation, the third locking member includes a tab aperture and the fourth locking member includes a resilient tab member, whereby the tab member is adapted to engage the tab aperture when the first cylindrical engagement portion is operatively inserted into the first pedestal member bore.

According to another aspect, the outer diameter of the first cylindrical engagement portion is different than the outer diameter of the second cylindrical engagement portion. In one variation, the outer diameter of the first cylindrical engagement portion can be less than the outer diameter of the second cylindrical engagement portion. According to another aspect, the inner diameter of the first cylindrical extension is substantially the same as the outer diameter of the first cylindrical engagement portion, whereby the first cylindrical engagement portion is adapted to be slidably received within the cylindrical base extension, such that the second cylindrical engagement portion wall is in load-bearing contact with the first cylindrical extension wall.

In another embodiment, a support pedestal having an adjustable height is provided. The support pedestal may include a base member, a support member and a coupling member operatively coupling the support member to the base member. The base member may include a base plate that is adapted to be placed upon a surface. A cylindrical base extension extends upwardly from the base plate and includes a base extension wall defining a base member bore. Base member threads may be disposed on a surface of the base extension wall and at least a first locking member may be formed on the base extension wall.

The support member may include a support plate having a top surface and a cylindrical support extension extending downwardly from the support plate. The cylindrical support extension may include a support extension wall and support member threads disposed on a surface of the support extension wall.

The coupling member may include a first cylindrical engagement portion and a second cylindrical engagement portion. The first cylindrical engagement portion may include a first cylindrical engagement portion wall and at least a second locking member that is adapted to engage with the first locking member. The second cylindrical engagement portion of the coupling member can include a second cylindrical engagement portion wall and coupling member threads disposed on a surface of the second cylindrical engagement portion wall. The coupling member threads can be adapted to rotatably engage with the support member threads such that the support member can be threaded onto the coupling member.

A number of feature refinements and additional features may be separately applicable to the foregoing embodiment. These feature refinements and additional features may be implemented individually or in any combination. In one aspect, the outer diameter of the first cylindrical engagement portion wall is different than the outer diameter of the second cylindrical engagement portion wall. For example, the outer diameter of the first cylindrical engagement portion wall may be less than the outer diameter of the second cylindrical engagement portion wall. In a further refinement, the inner diameter of the cylindrical base extension may be substantially the same as the outer diameter of the cylindrical engagement portion wall. In this manner, the first cylindrical engagement portion may be adapted to be slidably received within the base member bore when the first and second locking members are operatively aligned. Upon insertion of the coupling member into the base member, the second cylindrical engagement portion wall may be in load-bearing contact with the cylindrical base extension wall.

In one aspect, the engagement of the first and second locking members may operatively synchronize the base member threads and the coupling member threads, and may prevent rotation of the coupling member relative to the base member. In another aspect, the support member threads may be adapted to concurrently threadably engage with the coupling member threads and the base member threads. In this manner, the support member may be threadably engaged along the entire length of the coupling member and concurrently threaded onto the base member.

In another aspect, the first locking member may include at least one elongated rib and the second locking member may include at least one elongated slot, where the rib is adapted to slidably engage within the elongated slot when the first cylindrical engagement portion is inserted into the base member bore to operatively synchronize the base member threads. The engaged rib and slot may also prevent rotation of the base member relative to the coupling member.

In one aspect, the engagement of the first and second locking members may inhibit axial movement of the coupling member relative to the base member. In this manner, the coupling member will be fixed to the base member in a manner that enhances the stability of the support pedestal. For example, the first locking member may include a tab aperture and the second locking member may include a resilient tab member, whereby the tab member is adapted to engage the tab aperture when the first cylindrical engagement portion is inserted into the base member bore, such as to operatively align and synchronize the base member threads with the coupling member threads and to prevent rotation of the base member relative to the coupling member. In another refinement, the first locking member may also include a pair of elongated ribs forming at least one track and the resilient tab member may be adapted to slidably engage within the track when the first cylindrical engagement portion is inserted into the base member bore. In this regard, the tab aperture may be disposed within the track to engage the tab member.

According to another aspect, the length of the cylindrical support extension may be greater than the length of the second cylindrical engagement portion. In this manner, the support member can optionally be in concurrent threaded engagement with both the coupling member and the base member. According to another aspect, a second coupling member may be utilized to operatively couple the support member to the base member. The use of a second coupling member can advantageously further increase the obtainable height of the support pedestal. According to another aspect, the cylindrical base extension may include a third locking member that is disposed on the cylindrical base extension wall and the first cylindrical engagement portion may include a fourth locking member. The utilization of additional locking members can further increase the stability of the support pedestal.

In a further embodiment, a method for elevating a portion of a building surface above a fixed surface is provided. The method can include using a support pedestal that includes a base member, a support member and a coupling member. The base member may be positioned on a fixed surface where the base member includes a base extension wall extending upwardly and defining a base member bore. A first cylindrical engagement portion of a coupling member is slidably inserted into the base member bore such that the coupling member is inhibited from rotating relative to the base member and a second cylindrical engagement portion wall of the coupling member is in load-bearing contact with the base extension wall. A support member may be rotated into threaded engagement with the coupling member.

A number of refinements and additional steps may be separately applicable to the foregoing embodiment. These refinements and additional steps may be implemented individually or in any combination. In one aspect, the rotating step can include continuing to rotate the support member so that the support member is in concurrent threaded engagement with both the coupling member and the base member. According to another aspect, the coupling member may be inhibited from vertical movement relative to the base member.

According to another aspect, the method may also include the step of slidably inserting a second coupling member into a bore formed in the second cylindrical engagement portion before rotating the support member into threaded engagement with the coupling member.

According to another embodiment, a support pedestal is provided. The support pedestal may include a base member having a base plate that is adapted to be placed upon a surface. A first cylindrical extension may extend upwardly from the base plate where the first cylindrical extension includes a first cylindrical extension wall having an inner surface and an outer surface and a first cylindrical extension bore defined by the inner surface. A coupling member is included where the coupling member includes a first cylindrical engagement portion that is adapted to be slidably engaged with the first cylindrical extension bore, and a second cylindrical engagement portion having an outer diameter that is greater than the outer diameter of the first cylindrical engagement portion. The second cylindrical engagement portion wall may be placed in load-bearing contact with the base extension wall. A support plate may be disposed over the coupling member to complete the support pedestal.

According to one aspect of this support pedestal, the pedestal can further include a first locking member disposed on the first cylindrical extension wall and a second locking member disposed on the first cylindrical engagement portion, wherein the first and second locking members are adapted to inhibit axial movement of the coupling member relative to the base member.

DESCRIPTION OF THE INVENTION

Figure 1:
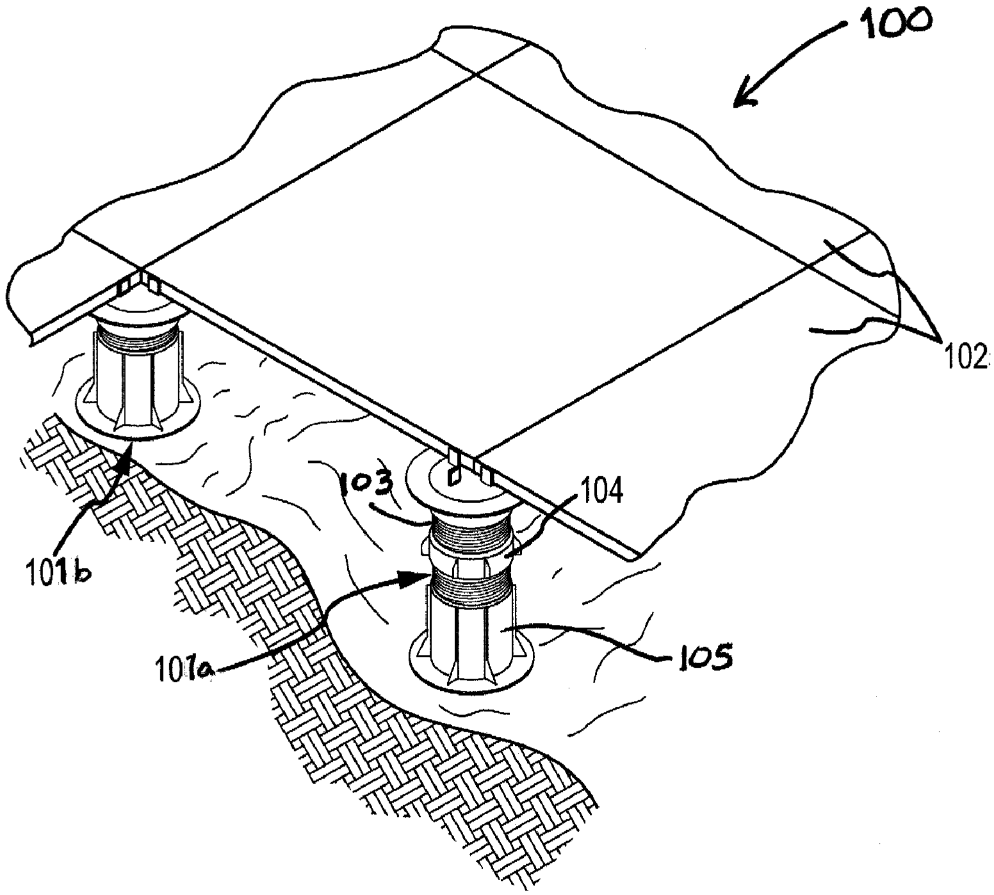
FIG.1 (PRIOR ART)
FIG. 1 illustrates a perspective view of a building surface assembly including a plurality of support pedestals supporting a plurality of surface tiles.

FIG. 1 illustrates a plurality of conventional support pedestals 101*a*, 101*b* supporting a plurality of surface tiles 102 to form a building surface assembly 100. An example of a support pedestal of this design is illustrated, for example, in U.S. Pat. No. 5,588,264 by Buzon which is hereby incorporated by reference. As is illustrated in FIG. 1, the support pedestals 101*a*, 101*b* can be placed on a fixed surface and support a plurality of surface tiles 102 above the fixed surface.

To create a building surface that reduces or eliminates the fluctuations in the fixed uneven surface beneath it, the support pedestals 101*a*, 101*b* may have different heights. For example, the support pedestal 101*a* has a height that is greater than the height of the support pedestal 100*b* due to a slope in the fixed surface beneath the support pedestals. In this regard, the support pedestal 100*a* includes a coupling member 104. The coupling member 104 includes internal threads into which a support member 103 is threaded, and external threads that enable the coupling member 104 to be threaded into a base member 105. However, the use of such coupling members 104 can leave a significant gap in the height that can be achieved using that support pedestal. That is, while each coupling member 104 allows an operator to attain greater support pedestal heights than without the coupling member 104, there is a range of support pedestal height, e.g., from the greatest structurally stable support pedestal height without the coupling member 104 to the smallest support pedestal height with the coupling member 104, that is unattainable.

The surface tiles that may be supported by the support pedestals may include a variety of surface tiles fabricated from a variety of materials. For example, the surface tiles may be fabricated from concrete, stone, slate, wood, plastic, wood-plastic composites and other materials that are useful for forming a building surface.

Figure 2:
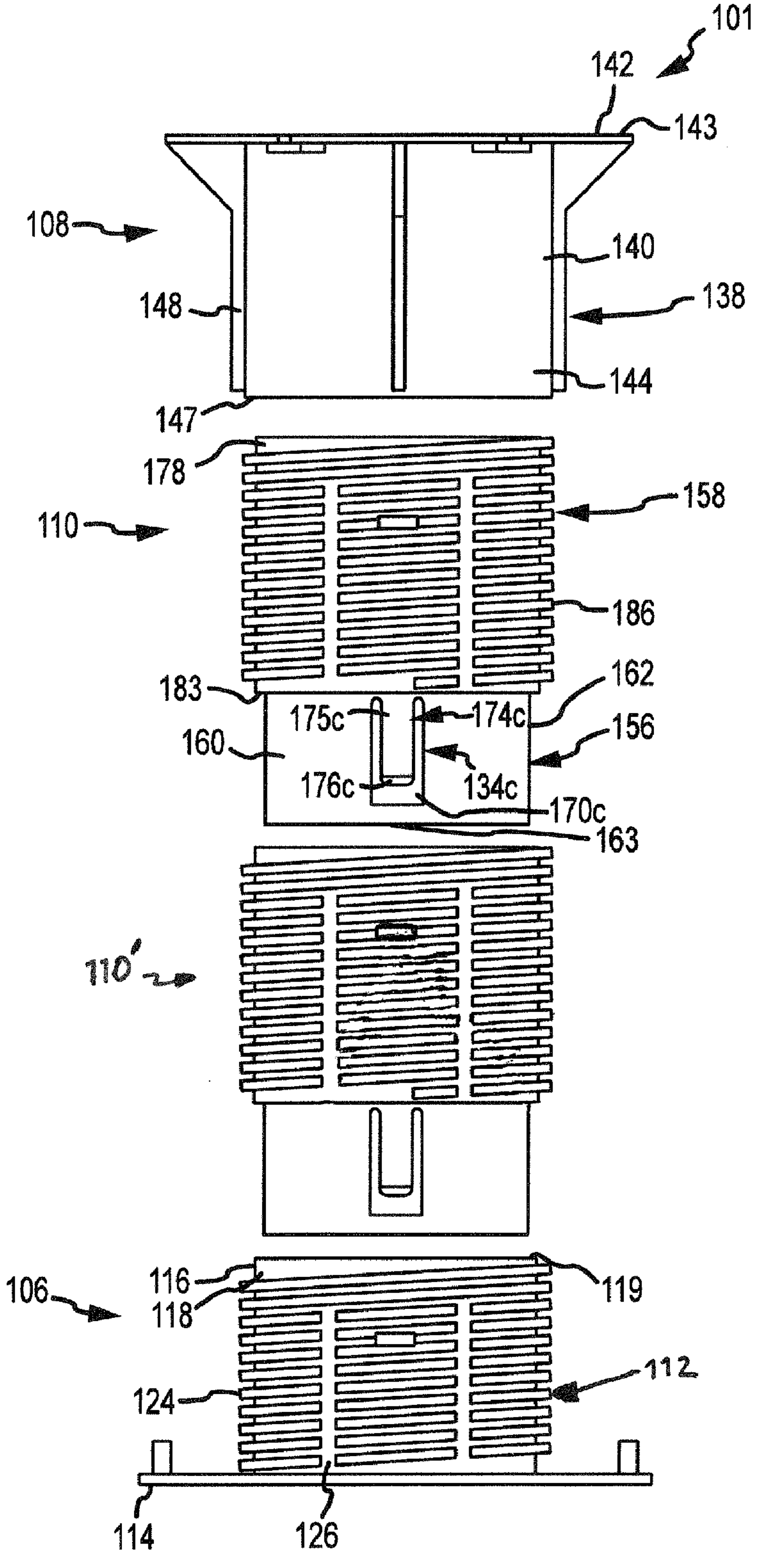
FIG. 2 illustrates an exploded perspective view of a support pedestal.
Figure 3:
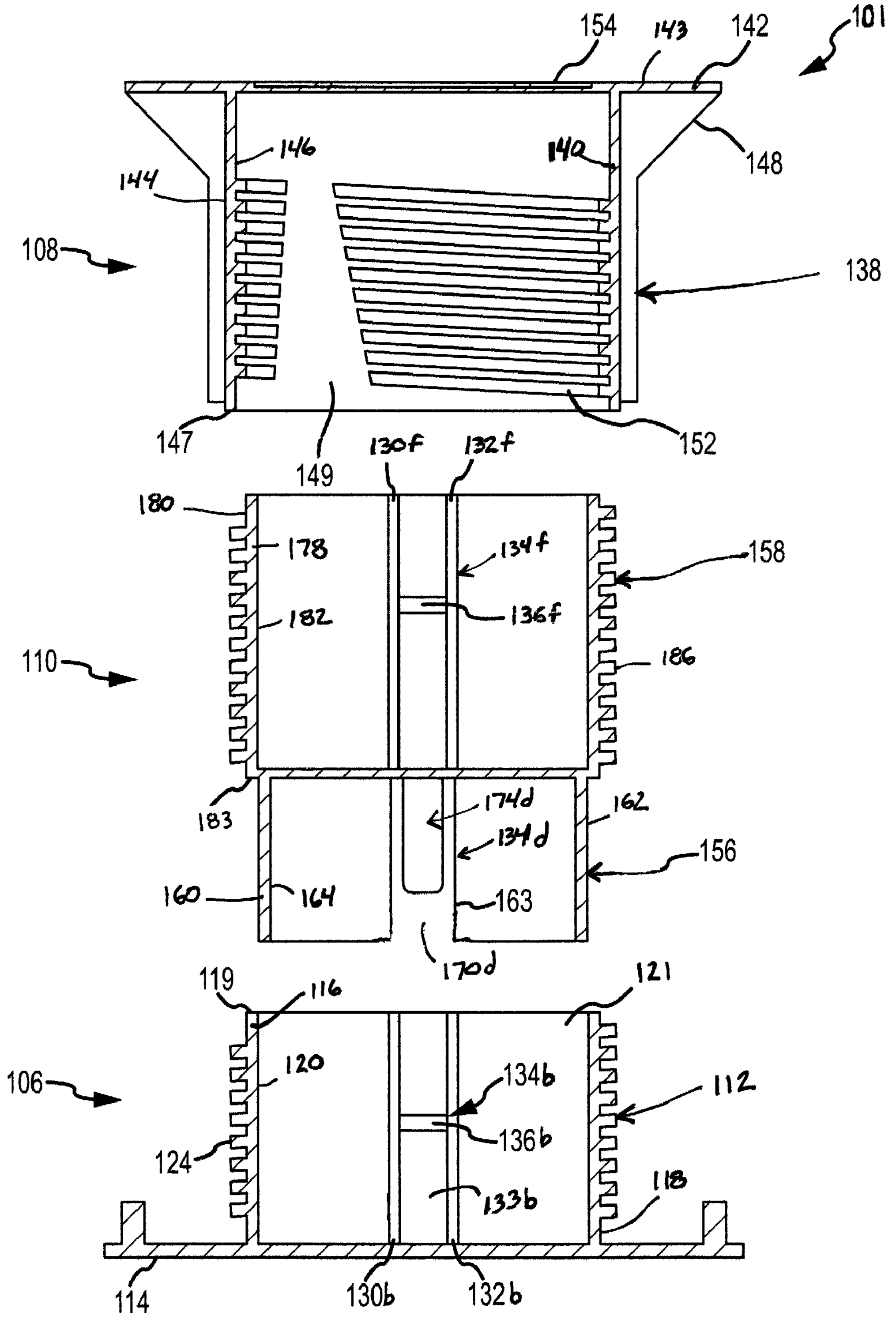
FIG. 3 illustrates an exploded cross-sectional view of a support pedestal.

FIG. 2 illustrates an exploded perspective view of a height-adjustable support pedestal 101 for supporting an object above a fixed surface according to an exemplary embodiment. FIG. 3 illustrates an exploded cross-sectional view of the same support pedestal 101, but without the additional coupling member 110'.

Referring to FIGS. 2 and 3, the height-adjustable support pedestal 101 may include three pedestal members: a first pedestal member, a second pedestal member and a coupling member operatively coupling the first and second pedestal members. Since the pedestal members are threadably engaged along their lengths, the support pedestal 101 has an adjustable height to enable the formation of a level elevated building surface above a fixed surface that is not level, or to enable the creation of desirable architectural features in the elevated building surface. As illustrated in FIGS. 2 and 3, the first pedestal member may be in the form of a base member 106 and the second pedestal member may be in the form of a support member 108. The coupling member 110 is adapted to be disposed between the base member 106 and the support member 108 to operatively couple the base member 106 to the support member 108 and to increase the obtainable height of the support pedestal 101.

Referring to FIGS. 2 and 3, the base member 106 may include a base plate 114 that is adapted to be placed upon a fixed surface. Although illustrated herein as having a circular configuration, the base plate 114 can have any appropriate configuration, such as a rectangular configuration.

The base member 106 also includes a cylindrical base extension 112 that extends upwardly from the base plate 114 when the base member 106 is operatively placed on a fixed surface. The cylindrical base extension 112 can include a base extension wall 116 having an outer surface 118, an inner surface 120, and a top surface 119. The inner surface 120 defines a base member bore 121. Base member threads 124 are disposed on the outer surface 118 of the base extension wall 116. While the base member threads 124 are illustrated as being disposed on the outer surface 118 of the base extension wall 116, it will be appreciated that in other embodiments base member threads may be disposed on an inner surface of the base extension wall.

The base member threads 124 extend outwardly from the outer surface 118 of the base extension wall 116. The base member threads 124 may be helically disposed along a length of the outer surface 118 and may be disposed along substantially the entire length of the outer surface 118. The base member threads 124 may be substantially continuous, e.g., a continuous single thread helically disposed on the surface, or can be discontinuous, e.g. such that one or more channels are formed between adjacent threads. For example, a channel 126 can be provided that intersects the base member threads 124, to indicate the amount of thread engagement of the base member 106. Drainage apertures (not illustrated) may also be provided to drain water out of the base member bore 121 and away from the support pedestal 101. Also, reinforcing flanges (not illustrated) may be disposed between the base plate 114 and the base extension 112 to provide additional strength and stability to the support pedestal 101, particularly if base member threads are disposed on an inner surface of the base extension wall.

The support pedestal 101 may also include a support member 108 that is disposed at the top of the support pedestal 101. The support member 108 can include a cylindrical support extension 138 that extends substantially transversely and downwardly from a support plate 142. The cylindrical support extension 138 includes a cylindrical support extension wall 140 having an outer surface 144, an inner surface 146, and a bottom surface 147. The inner surface 146 may define a support member bore 149. One or more reinforcing flanges 148 may be included to provide additional strength and stability to the support pedestal 101.

The cylindrical support extension 138 also includes support member threads 152 disposed on the inner surface 146 of the cylindrical support extension wall 140. The support member threads 152 may be helically disposed along the entire length of the inner surface 146 or a portion thereof. In other embodiments, support member threads may be disposed on an outer surface of the support extension wall.

The support plate 142 includes a top surface 143 and can be of any general shape that is desired such as circular or rectangular, and an object such as a surface tile can be placed directly on the top surface 143. Further, the support pedestal 101 can include a crown member (not illustrated) that may be disposed within a depression 154 in the top surface 143. In one embodiment, the crown member may be freely rotatable on the support plate 142 so that spacers (not shown) associated with the crown member can be configured as desired for supporting structural components such as pavers or the like in spaced-apart relation.

The support pedestal may be configured such that the support member threads 152 can be threadably engaged directly with the base member threads 124. The support pedestal 101 can also include a coupling member 110 that is adapted to be disposed between the base member 106 and the support member 108 to couple the base member 106 to the support member 108. The coupling member 110 may advantageously increase the height of the support pedestal 101, and it will be appreciated that more than one coupling member can be utilized to further increase the height of the support pedestal. For example, FIG. 2 illustrates the use of an additional coupling member 110' between the coupling member 110 and the base member 106.

The coupling member 110 may include a first cylindrical engagement portion 156 and a second cylindrical engagement portion 158. The first cylindrical engagement portion 156 may include a first cylindrical engagement portion wall 160 having an outer surface 162 and an inner surface 164. Similarly, the second cylindrical engagement portion 158 may include a second cylindrical engagement portion wall 178. The wall 178 may include an outer surface 180, an inner surface 182, and a bottom surface 183.

The first cylindrical engagement portion 156 may have a size that is different than the size of the second cylindrical engagement portion 158. For example, the outer surface 162 of the first cylindrical engagement portion wall 160 can have a diameter that is smaller than the diameter of the outer surface 180 of the second cylindrical engagement portion wall 178. The outer surface 162 may be generally smooth for slidable insertion into the base member bore 121, as is described below. As such, the diameter of the outer surface 162 of the first cylindrical engagement portion 156 may be substantially the same or slightly smaller than the diameter of the inner surface 120 of the base extension wall 116. The first cylindrical engagement portion 156 may also have a length that is substantially the same as or less than the depth of the base member bore 121. In this manner, when the coupling member 110 is engaged with the base member 106 by slidably inserting the first cylindrical engagement portion 156 into the base member bore 121, the bottom surface 183 of the second cylindrical engagement portion 158 will be in load bearing contact with the top surface 119 of the cylindrical base extension wall 116. Such a configuration can advantageously improve the strength of the support pedestal 101 by relieving some of the stresses that are placed upon the generally weaker threaded portions of the support pedestal.

The support pedestal 101 may also include one or more locking members disposed on at least two of the pedestal members. The locking members may provide at least one of the following functions in relation to the positioning and engagement of the various pedestal members. First, the locking members may cause the threads of two of the pedestal members, such as the coupling member and the base member, to become operatively synchronized when the two pedestal members are operatively attached. Further, the locking members may cooperate to prevent rotation of one pedestal member in relation to another pedestal member when the two pedestal members are operatively attached. Further, the locking members may inhibit vertical movement of one pedestal member in relation to another pedestal member when the two pedestal members are operatively attached. That is, the locking members may prevent the pedestal members from becoming accidentally detached and may provide increased overall structural stability to the support pedestal. The locking members may include one or more of several elements, such as those that are illustrated and described below, to provide one or more of these functions.

Referring to FIG. 3, the base extension wall 116 may include a locking member 134*b*. As illustrated in FIG. 3, the locking member 134*b* includes several elements, including a first elongated rib 130*b* and a second elongated rib 132*b* disposed on the inner surface 120 of the base extension wall 116. The ribs 130*b* and 132*b* form a track 133*b* disposed between the ribs. The locking member 134*b* also includes a tab aperture 136*b* disposed within the track 133*b*.

Figure 6:
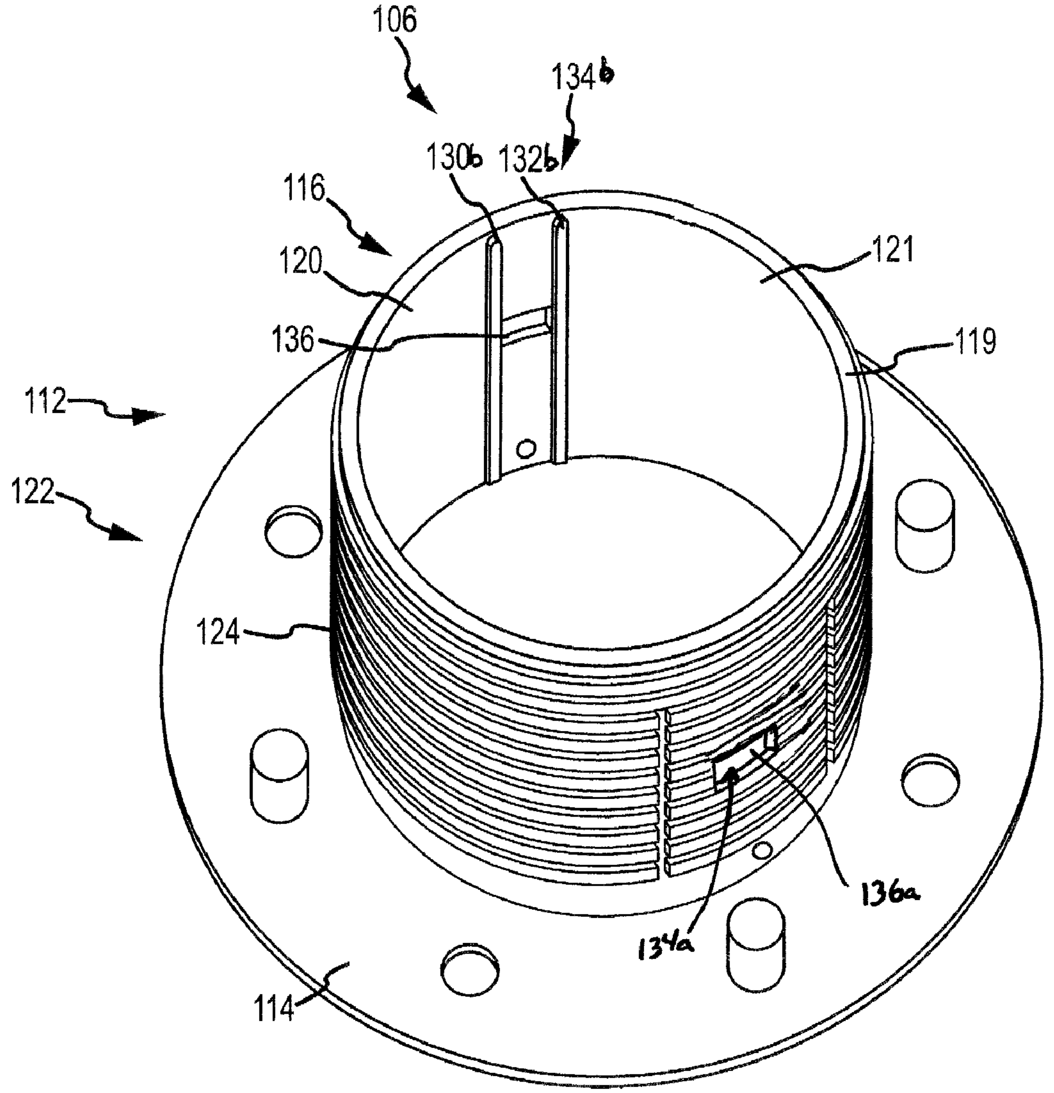
FIG. 6 illustrates a perspective view of a base member of a support pedestal.

Referring now to FIG. 6, a perspective view of the base member 106 including the locking member 134*b* is illustrated. It can be seen that the ribs 130*b* and 132*b* extend outwardly from the inner surface 120 of the base extension wall 116. Although the ribs 130*b* and 132*b* are illustrated as extending along the entire length of the cylindrical base extension wall 116, the ribs may extend along only a portion of the length of the wall.

Referring back to FIG. 3, the locking member 134*b* may be adapted to engage with a second locking member 134*d* disposed on the first cylindrical engagement portion 156. The locking member 134*d* can include an open-ended slot 170*d* that is adapted to slide over the ribs 130*b* and 132*b*. When the first cylindrical engagement portion 156 of the coupling member 110 is inserted into the base member bore 121 such that the slot 170*d* engages the ribs 130*b* and 132*b*, the coupling member threads 186 may be operatively synchronized with the base member threads 124. Further, rotation of the coupling member 110 with respect to the base member 106 will be prevented so that the threads may remain synchronized. Other configurations of these or similar elements may be utilized to achieve this result. For example, the locking member 134*b* could include a single rib onto which a single slot in the locking member 134*d* is placed to align the threads.

Figure 4:
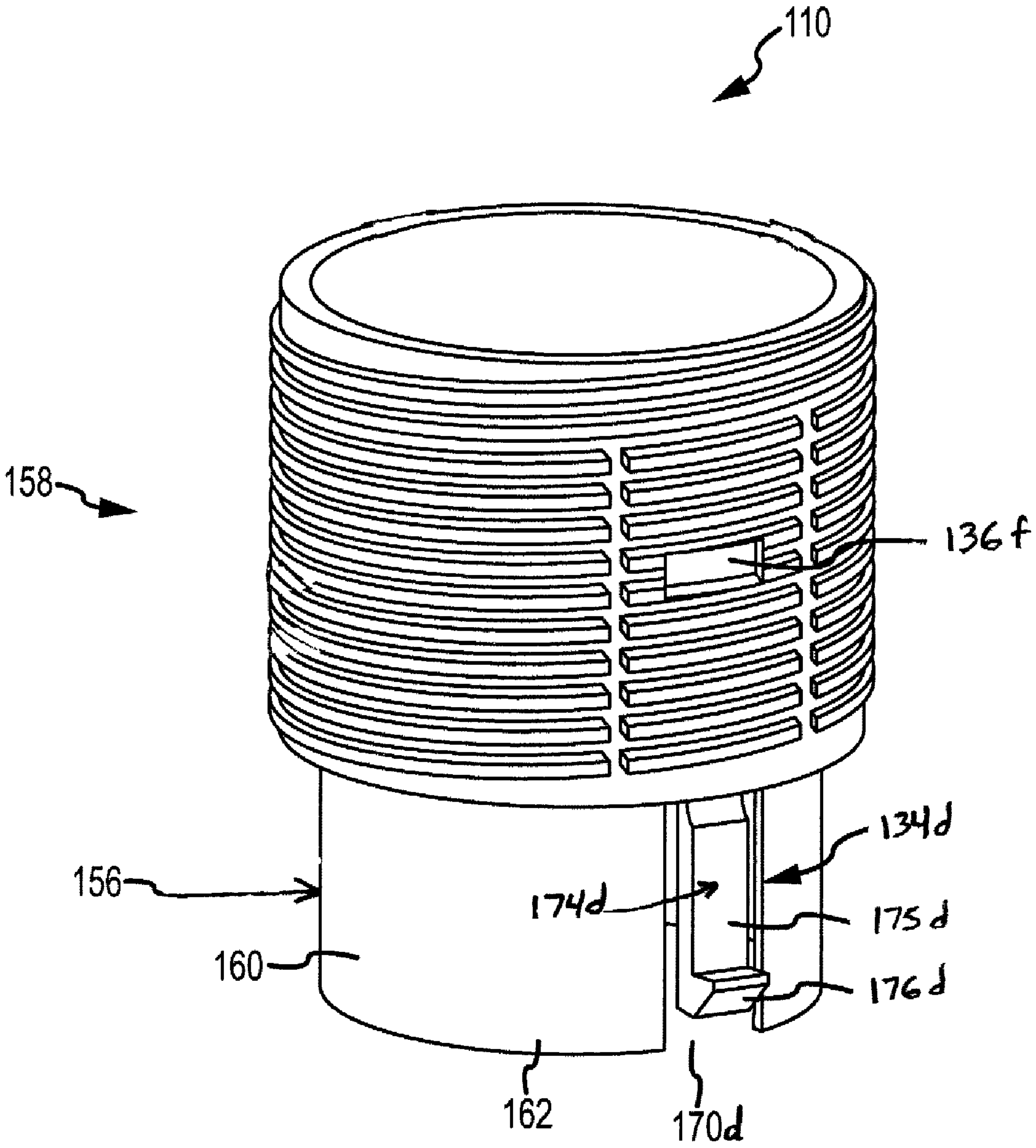
FIG. 4 illustrates a perspective view of a coupling member of a support pedestal.

As illustrated in FIGS. 3 and 4, the locking member 134*d* may also include a tab member 174*d* that is adapted to engage with the tab aperture 136*b* in the locking member 134*b*. As illustrated in FIG. 4, the locking member 134*d* includes a slot 170*d* that is adapted to align with ribs in a base member. The locking member 134*d* also includes a tab member 174*d* having a resilient arm 175*d* and a tab 176*d* disposed at the end of the resilient arm 175*d*. When the tab member 174*d* engages the tab aperture 136*b*, axial (i.e., vertical) movement of the coupling member 110 with respect to the base member 106 may be prevented. This also enhances the structural stability of the support pedestal. Although the tab aperture 136*b* is illustrated as extending completely through the base extension wall 116, the aperture 136*b* may extend only through a portion of the base extension wall.

Referring back to FIG. 2, the first cylindrical engagement portion 156 may include an additional locking member 134*c*. As illustrated in FIGS. 2-5, the locking member 134*c* is disposed on the opposite side of the first cylindrical engagement portion 156 from the locking member 134*d*, i.e., about 180° from the locking member 134*d*.

Figure 5:
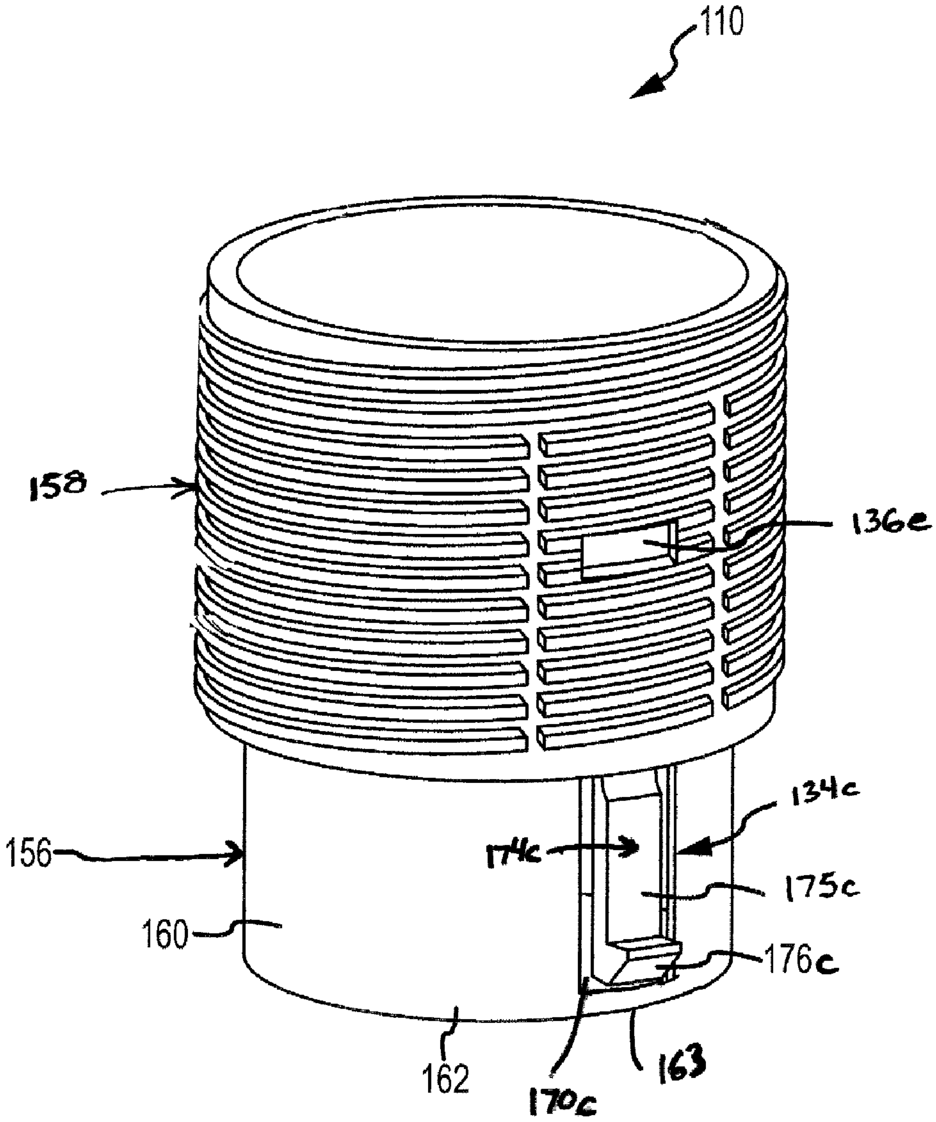
FIG. 5 illustrates a perspective view of a coupling member of a support pedestal.

Referring to FIGS. 2 and 5, the locking member 134*c* also includes a tab member 174*c* that includes a resilient arm 175*c* and a tab 176*c* disposed at the end of the resilient arm 175*c*. When the first cylindrical engagement portion 156 is inserted into the base member bore, the tab 176*c* can engage the tab aperture 136*a* disposed in the cylindrical base extension wall 116 in a manner similar to that described above for tab member 174*d* and tab aperture 136*b*.

It should be noted that the slot 170*c* in which the tab member 174*c* is disposed is a closed slot. That is, the slot 170*c*, does not extend all the way down to the bottom surface 163 of the first cylindrical engagement portion wall 160. In this manner, the coupling member 110 cannot be placed into the base member 106 unless the slot 170*d* is aligned with the ribs 130*b* and 132*b* (FIGS. 3 and 4).

The locking member 134*c* is adapted to engage with locking member 134*a* in the cylindrical base extension wall 116. As illustrated in FIGS. 2 and 6, the locking member 134*c* comprises only a tab aperture 136*a* for engaging the tab member 174*c*.

Further, as is illustrated in FIGS. 2 and 3, the coupling member 110 can include additional locking members, particularly locking members that are disposed on the second cylindrical engagement portion 158. In this manner, additional coupling members can be engaged with the coupling member 110 to further increase the pedestal support height, while maintaining a stable structure and providing a synchronized, threaded surface on the outside of the support pedestal. For example, an additional coupling member that is substantially identical to coupling member 110 could be attached by inserting the first cylindrical engagement portion of the additional coupling member into the bore 159 of the second cylindrical engagement portion 158. In this regard, the second cylindrical engagement portion 158 can include a locking member 134*f* that includes ribs 130*f* and 132*f* and a tab aperture 136*f*, in a manner that is substantially identical to the locking member 134*b* disposed on the cylindrical base extension wall 116.

In use, an operator may slidably insert the first cylindrical engagement portion 156 into the base member bore 121 such that slot 170*d* engages with the first and second elongated ribs 130*b*, 132*b*. At this point, the coupling member 110 generally cannot rotate relative to the base member 106 and vice versa.

Continued insertion of the first cylindrical engagement portion 156 into the base member bore 121 eventually results in the tab member 174*d* engaging with the tab aperture 136*b*, which prevents vertical or axial displacement of the coupling member 110 relative to the base member 106. To thereafter permit vertical or axial displacement of the coupling member 110 relative to the base member 106, a user can insert a tool (e.g. screwdriver) into the tab aperture 136*b* to deflect the tab member 174*d* out of engagement with the aperture 136*b*.

Figure 7:
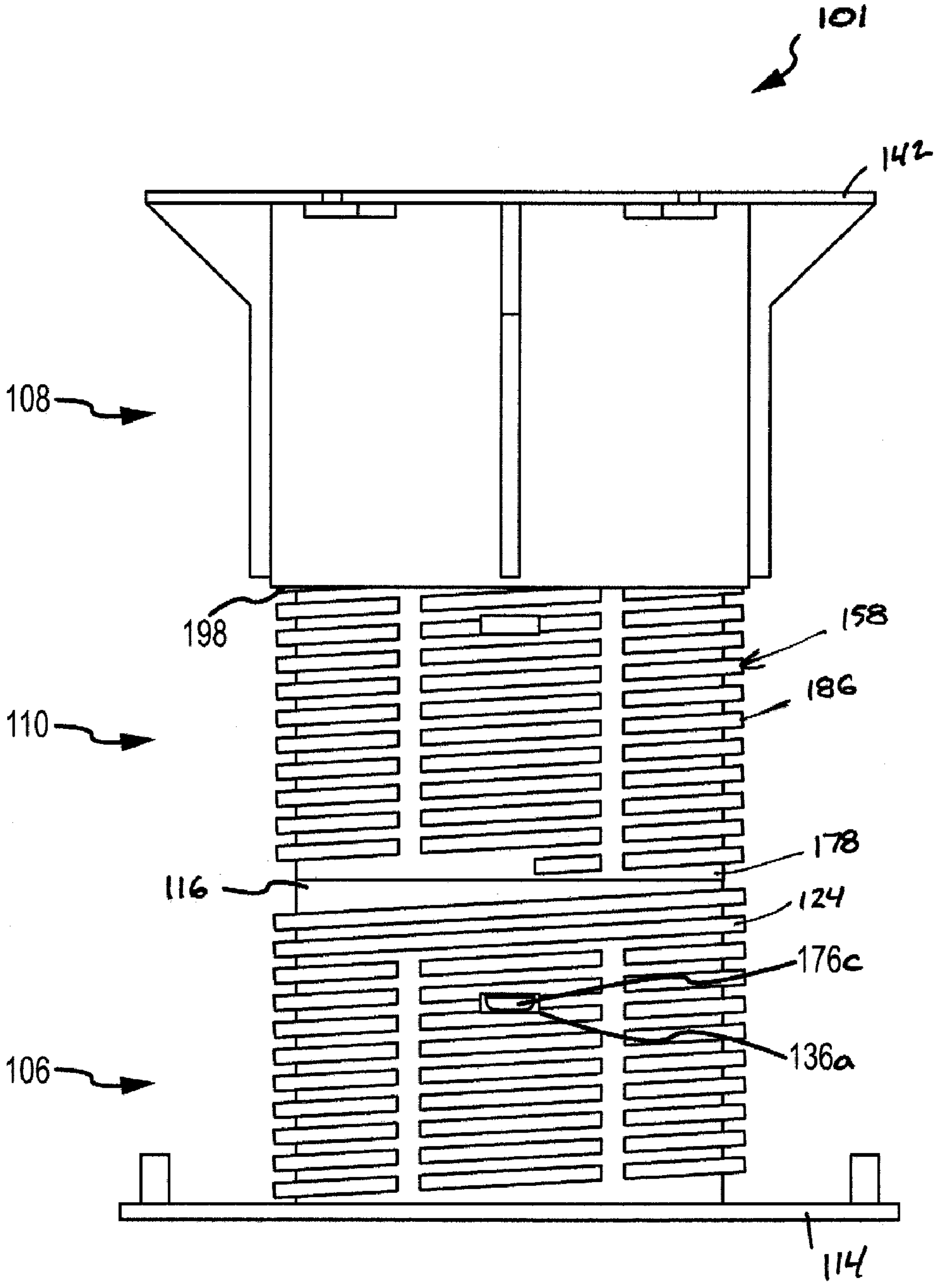
FIG. 7 illustrates a perspective view of an assembled support pedestal.

FIG. 7 illustrates an assembled support pedestal 101 with the coupling member 110 operatively coupling the base member 106 to the support member 108 when the first cylindrical engagement portion is slidably inserted into the base member bore. The bottom surface of the second cylindrical engagement wall 178 is in load-bearing contact with the top surface of the base extension wall 116. That is, a load placed upon the support pedestal will be borne primarily by the second cylindrical engagement wall 178 and the base extension wall 116.

The support member 108 is attached to the coupling member 110 by rotatably engaging the support member threads with the coupling member threads 186. Using the support pedestal 101, an operator can adjust the height of the support plate 142 relative to the base plate 114 to provide a desired height of a level surface (e.g. building surface) relative to a level or unlevel fixed surface (e.g. ground surface). More specifically, either before or after placing the base plate 114 onto the fixed surface, an operator may rotate one pedestal member relative to the other pedestal members to adjust the height of the support plate 142. The coupling member 110 can be engaged with the base member 106 either before or after the coupling member 110 is engaged with the support member 108.

Figure 8:
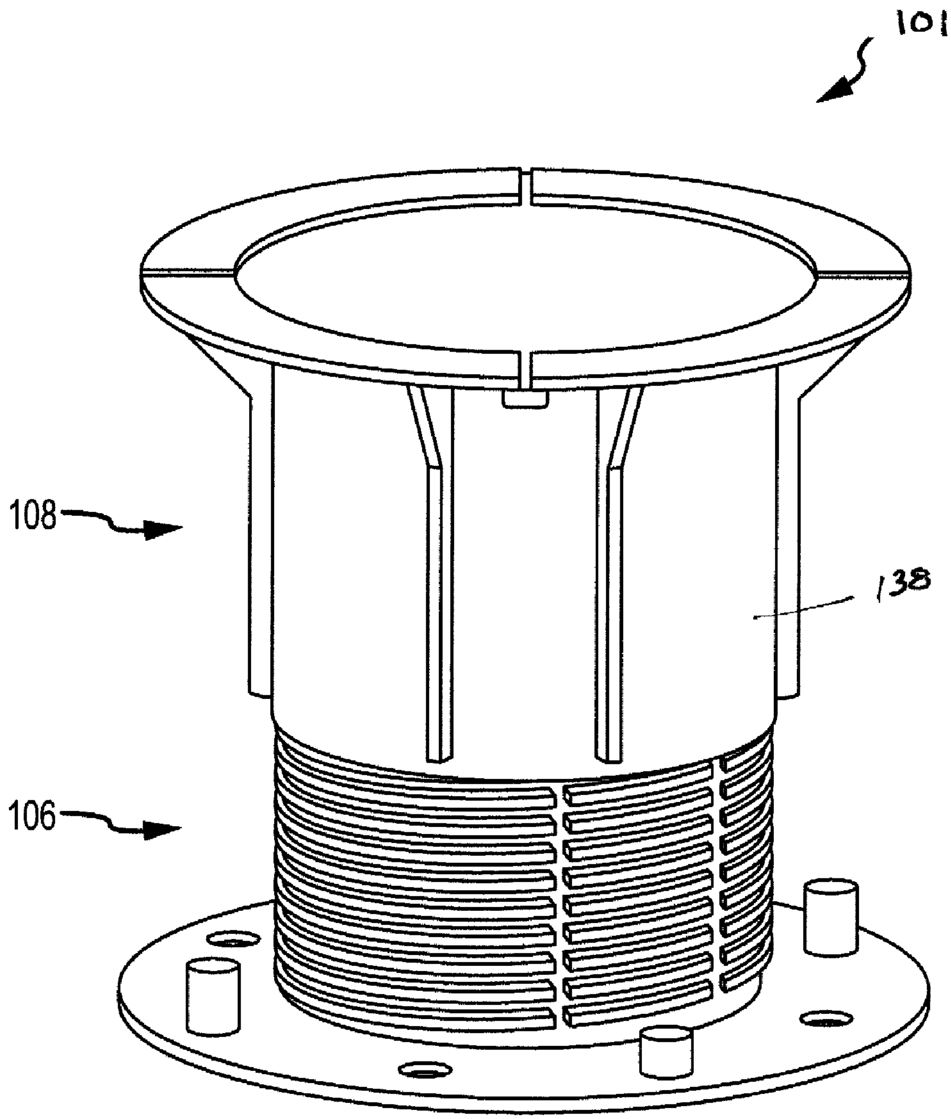
FIG. 8 illustrates a perspective view of an assembled support pedestal.

As can be seen in FIG. 7, the base member threads 124 are operatively synchronized with the coupling member threads 186. In this regard, the coupling member threads 186 and the base member threads 124 may have substantially the same thread pitch and the threads may have substantially the same crest height. Further, the outer diameter of the second cylindrical engagement portion wall 178 may be substantially the same as the outer diameter of the cylindrical base extension wall 116. Thus, the coupling member threads 186 and the base member threads 124 combine to form a substantially continuous and uniform threaded surface. Accordingly, an operator can rotate the support member 108 into engagement with the coupling member 110, and then continue rotating the support member 108 into engagement with the base member 106 to the orientation illustrated in FIG. 8. Stated otherwise, the support member 108 can be in concurrent threaded engagement with both the coupling member 110 and the base member 106. As such, the length of the cylindrical support extension 138 may be greater than the length of the second cylindrical engagement portion 158 to allow the support member bore 149 to fully encapsulate the second cylindrical engagement portion 158 eliminating any gaps in adjustment height.

When a very low support pedestal height is desired, a support pedestal 101 can be assembled without the use of the coupling member 110. In this manner, the support member 108 can rotatably engage the base member 106 directly, such as until the bottom surface 147 of the support member 108 is in contact with or adjacent to the base plate 114. From this minimum height, the support member 108 can be rotated to move upwardly from the base member 106 to increase the height of the support pedestal 101 to a first height that still provides for a structurally stable support pedestal 101. Inserting the coupling member 110 into the structure, as is described above, enables taller support pedestals to be formed. In one exemplary embodiment, the pedestal can be adjusted from a total height of about 5¾ inches to a total height of about 13¾ inches, with no substantial gap in the height that can be achieved. Using an additional coupling member can further increase the height of the support pedestal, for example up to about 17¾ inches or higher.

Figure 9:
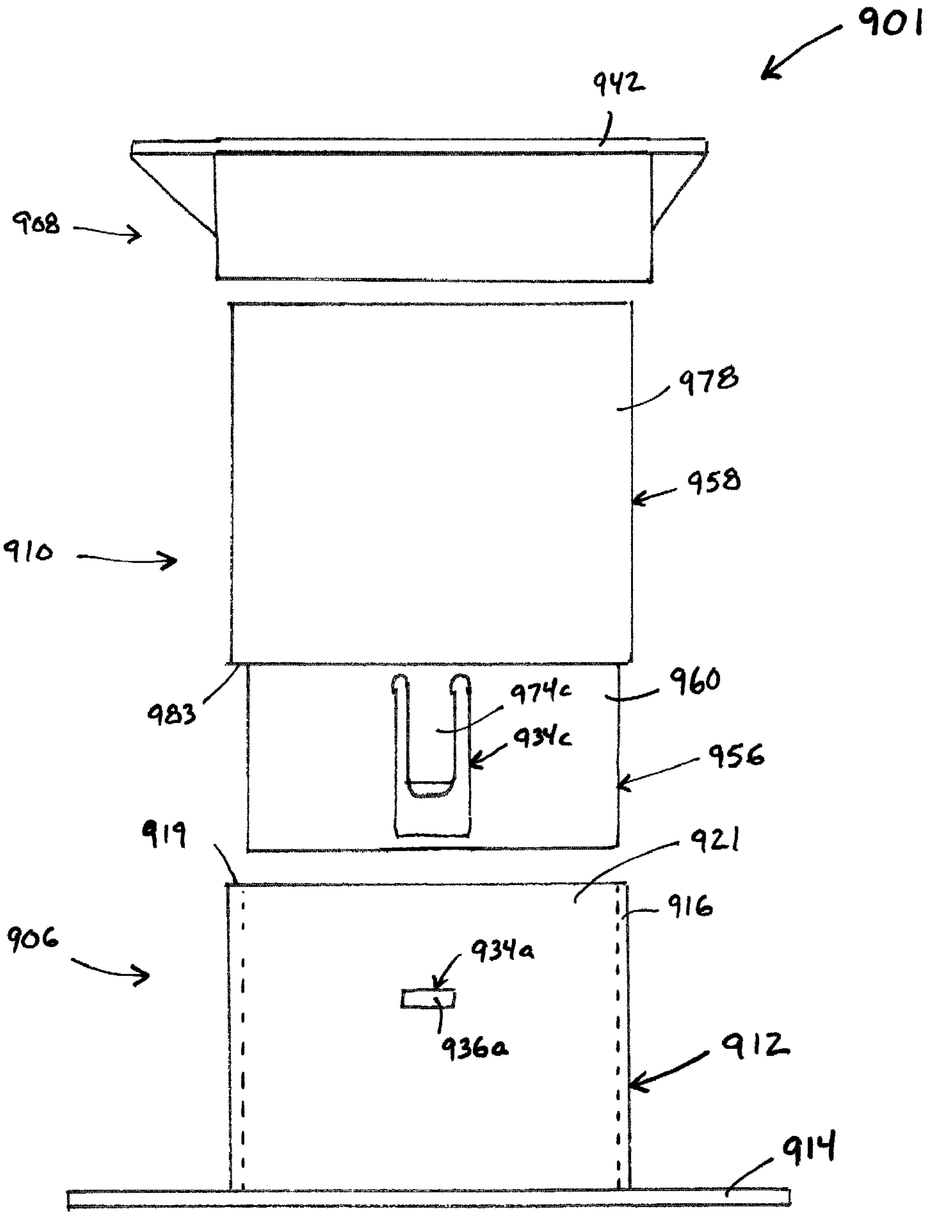
FIG. 9 illustrates a perspective view of an assembled support pedestal.

As is noted above, the locking members may function to increase the stability of a support pedestal by inhibiting vertical movement of one pedestal member in relation to another pedestal member, such as by inhibiting vertical movement of the coupling member relative to the base member. In this regard, the pedestal member may or may not comprise threaded surfaces for attaching the various pedestal members. FIG. 9 illustrates a support pedestal that includes a base member 912, a support member 908 and a coupling member 910. The base member 906 includes a base plate 914 and a cylindrical base extension 912 extending upwardly from the base plate 914. The cylindrical base extension includes a cylindrical base extension wall 916 having a top surface 919 and defining a base member bore 921.

The coupling member 910 includes a first cylindrical engagement portion 956 and a second cylindrical engagement portion 958 that includes a second cylindrical engagement portion wall 978 having an outer diameter that is greater than the outer diameter of the first cylindrical engagement portion wall 960. The first cylindrical engagement portion 956 is adapted to be slidably engaged within the base member bore 921. In this manner, the lower surface 983 of the wall 978 comes into load-bearing contact with the upper surface 919 of the wall 916.

A locking member 934*c* disposed in the wall 960 includes a tab member 974*c*. The tab member 974*c* is adapted to engage a tab aperture 936*a* of a locking member 934*a* disposed in the base extension wall 916. In this manner, the engagement of the locking members 934*c* and 934*a* inhibits axial movement of the coupling member 910 relative to the base member 906.

A support member 908 having a support plate 942 can be disposed over the base member 906 by attaching the support member 908 to the coupling member 910 to complete the support pedestal 901.

Figure 10:
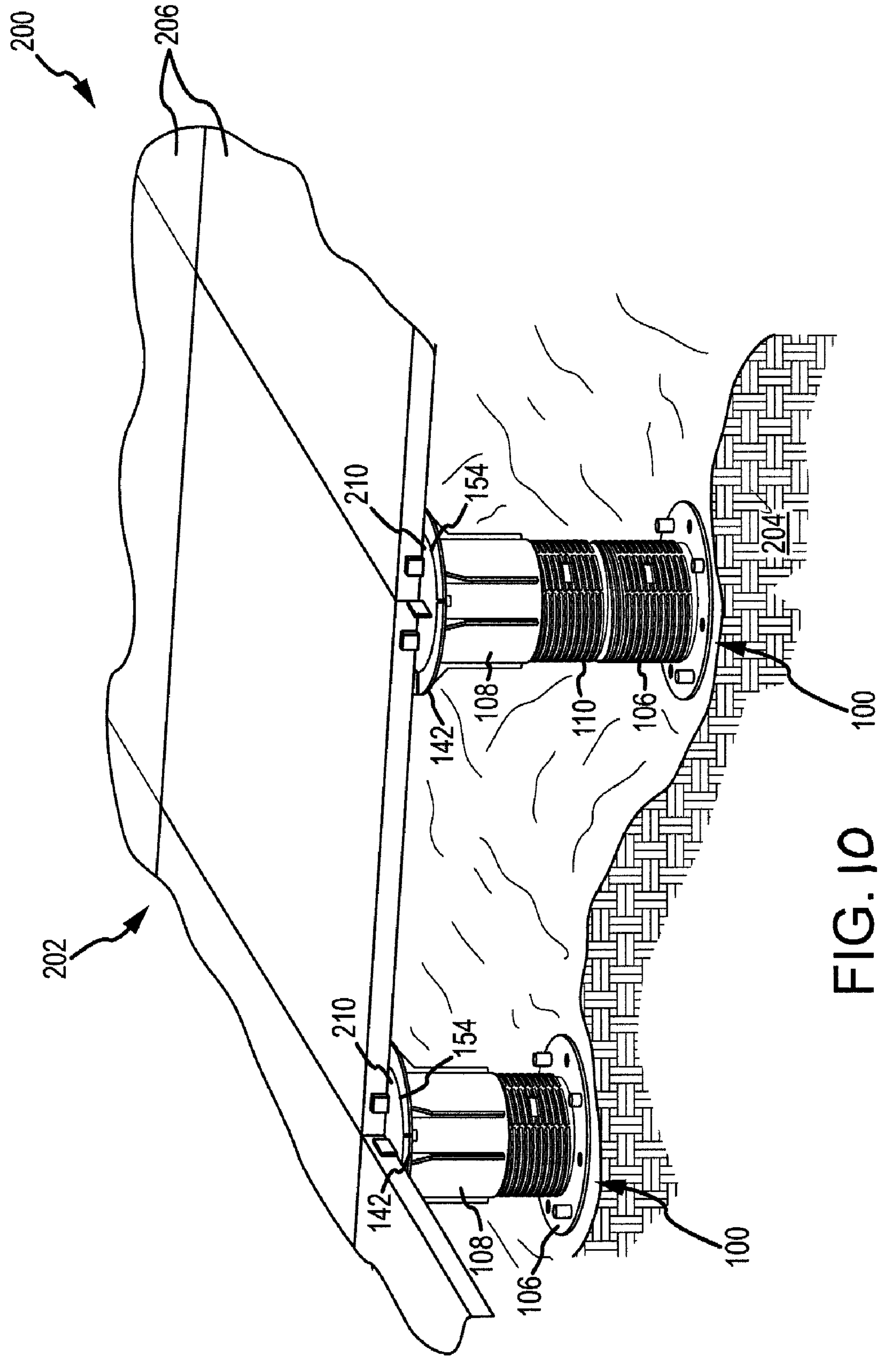
FIG. 10 illustrates a perspective view of a building surface assembly including a plurality of support pedestals supporting a plurality of surface tiles on an uneven surface.

FIG. 10 illustrates a perspective view of a building surface assembly 200 including support pedestals 100 supporting a building surface 202 on an uneven fixed surface 204. During assembly, an operator may slidably insert a coupling member 110 into a base member 106, either before or after engaging the coupling member with the support member 108. Additional coupling members 110 can be utilized to accommodate greater heights. A crown member 210 may be added to the depression 154 on the support plate 142 to adequately space the building surface members from each other. After placement of the building surface members 206 on the support pedestals 100, minor adjustments in the elevation of a support pedestal 100 can be made, for example by rotating the base member 106. The preceding process may be repeated row by row or column by column until the building surface is installed.

The support pedestal members can be fabricated from a wide variety of materials. Preferably, the material will be able to withstand prolonged exposure to moisture and/or ultraviolet radiation so that the support pedestal can be utilized in outdoor applications. In one particular aspect, the support pedestal members may be fabricated from a high density, durable and impact resistant polymer, such as polypropylene. However, the support pedestal elements can be fabricated from other materials, including composite materials. Further, it is not necessary that each element of the support that still be fabricated from the same material.

While various embodiments have been described in detail, it is apparent that modifications and adaptations of such embodiments will occur to those skilled in the art. It is to be expressly understood that these and other such modifications and adaptations are within the spirit and scope of the embodiments.

What is claimed is:

1. An adjustable-height support pedestal, comprising:
- a first pedestal member, the first pedestal member comprising a first plate and a first cylindrical extension extending away from the first plate, the first cylindrical extension comprising:
  - a first cylindrical extension wall having an inner surface and an outer surface, the inner surface defining a first pedestal member bore; and
  - first pedestal member threads disposed on the outer surface of the first cylindrical extension wall,
- a second pedestal member, the second pedestal member comprising a second plate and a second cylindrical extension extending away from the second plate, the second cylindrical extension comprising:
  - a second cylindrical extension wall having an inner surface and an outer surface, the inner surface defining a second pedestal member bore; and
  - second pedestal member threads disposed on the inner surface of the second cylindrical extension wall,
- a coupling member operatively coupling the first pedestal member to the second pedestal member, the coupling member comprising:
  - a first cylindrical engagement portion comprising a first cylindrical engagement portion wall having an inner surface and an outer surface, where the first cylindrical engagement portion is inserted into the first pedestal member bore; and
  - a second cylindrical engagement portion comprising a second cylindrical engagement portion wall having an inner surface and an outer surface, and comprising coupling member threads disposed on the outer surface of the second cylindrical engagement portion that are rotatably engaged with the second pedestal member threads,
- at least a first locking member disposed on the inner surface of the first cylindrical extension wall; and
- at least a second locking member on the first cylindrical engagement portion of the coupling member, wherein the first locking member and the second locking member cooperate to operatively synchronize the first pedestal member threads with the coupling member threads when the first cylindrical engagement portion is fully inserted into the first pedestal member bore.

2. The support pedestal as recited in claim 1, wherein the first locking member comprises at least one elongated rib and the second locking member comprises at least one elongated slot, whereby the at least one elongated rib is adapted to slidably engage within the at least one elongated slot when the first cylindrical engagement portion is inserted into the first pedestal member bore to operatively synchronize the first pedestal member threads with the coupling member threads and to prevent rotation of the first pedestal member relative to the coupling member.

3. The support pedestal as recited in claim 1, wherein the first locking member comprises a tab aperture and the second locking member comprises a resilient tab member, whereby the tab member is adapted to engage the tab aperture when the first cylindrical engagement portion is inserted into the first pedestal member bore to operatively synchronize the first pedestal member threads with the coupling member threads and to prevent rotation of the first pedestal member relative to the coupling member.

4. The support pedestal as recited in claim 3, wherein the first locking member and the second locking member are further adapted to inhibit axial movement of the coupling member relative to the first pedestal member when the first cylindrical engagement portion is inserted into the first pedestal member bore.

5. The support pedestal as recited in claim 3, wherein the first locking member further comprises a pair of elongated ribs forming at least one track, wherein the resilient tab member is adapted to slidably engage with the track when the first cylindrical engagement portion is inserted into the first pedestal member bore.

6. The support pedestal as recited in claim 1, further comprising a third locking member that is disposed on the first cylindrical extension wall and a fourth locking member that is disposed on the first cylindrical engagement portion of the coupling member.

7. The support pedestal as recited in claim 6, wherein the third locking member comprises a tab aperture and the fourth locking member comprises a resilient tab member, whereby the tab member is adapted to engage the aperture when the first cylindrical engagement portion is inserted into the first pedestal member bore.

8. The support pedestal as recited in claim 1, wherein the outer diameter of the first cylindrical engagement portion is different than the outer diameter of the second cylindrical engagement portion.

9. The support pedestal as recited in claim 1, wherein the inner diameter of the first cylindrical extension is substantially the same as the outer diameter of the first cylindrical engagement portion, whereby the first cylindrical engagement portion is adapted to be slidably received within the cylindrical base extension, such that the second cylindrical engagement portion wall is in load-bearing contact with the first cylindrical extension wall.

10. A support pedestal having an adjustable height, comprising: a base member, the base member comprising, a base plate that is adapted to be placed upon a surface, and a cylindrical base extension extending upwardly from the base plate, the cylindrical base extension comprising a base extension wall defining a base member bore, base member threads disposed on a surface of the base extension wall, and at least a first locking member formed on the base extension wall; a support member, the support member comprising, a support plate having a top surface, and a cylindrical support extension extending downwardly from the support plate, the cylindrical support extension comprising a support extension wall and support member threads disposed on a surface of the support extension wall; and a coupling member operatively coupling the support member to the base member, the coupling member comprising: a first cylindrical engagement portion comprising a non-threaded first cylindrical engagement portion wall and at least a second locking member that is adapted to engage with the first locking member, and a second cylindrical engagement portion comprising a second cylindrical engagement portion wall and coupling member threads disposed on a surface of the second cylindrical engagement portion wall that are adapted to rotatably engage with the support member threads; wherein the first locking member and the second locking member cooperate to operatively synchronize the base member threads with the coupling member threads.

11. The support pedestal as recited in claim 10, wherein an outer diameter of the first cylindrical engagement portion wall is different than an outer diameter of the second cylindrical engagement portion wall.

12. The support pedestal as recited in claim 11, wherein the outer diameter of the first cylindrical engagement portion wall is less than the outer diameter of the second cylindrical engagement portion wall.

13. The support pedestal as recited in claim 12, wherein an inner diameter of the cylindrical base extension is substantially the same as an outer diameter of the first cylindrical engagement portion wall, whereby the first cylindrical engagement portion is adapted to be slidably received within the base member bore when the first and second locking members are operatively aligned such that the second cylindrical engagement portion wall is in load-bearing contact with the cylindrical base extension wall.

14. The support pedestal as recited in claim 10, wherein the engagement of the first and second locking members operatively synchronizes the base member threads and the coupling members threads and prevents rotation of the coupling member relative to the base member.

15. The support pedestal as recited in claim 14, wherein the support member threads are adapted to concurrently threadably engage with the coupling member threads and the base member threads.

16. The support pedestal as recited in claim 14, wherein the first locking member comprises at least one elongated rib and the second locking member comprises at least one elongated slot, whereby the at least one elongated rib is adapted to slidably engage within the at least one elongated slot when the first cylindrical engagement portion is inserted into the base member bore to operatively synchronize the base member threads with the coupling member threads and to prevent rotation of the base member relative to the coupling member.

17. The support pedestal as recited in claim 10, wherein the engagement of the first and second locking members inhibits axial movement of the coupling member relative to the base member.

18. The support pedestal as recited in claim 17, wherein the first locking member comprises a tab aperture and the second locking member comprises a resilient tab member, whereby the tab member is adapted to engage the tab aperture when the first cylindrical engagement portion is inserted into the base member bore to operatively align and synchronize the base member threads with the coupling member threads and to prevent rotation of the base member relative to the coupling member.

19. The support pedestal as recited in claim 18, wherein the first locking member further comprises a pair of elongated ribs forming at least one track and the resilient tab member is adapted to slidably engage with the track when the first cylindrical engagement portion is inserted into the base member bore.

20. The support pedestal as recited in claim 19, wherein the tab aperture is disposed within the at least one track.

21. The support pedestal as recited in claim 10, wherein a length of the cylindrical support extension is greater than a length of the second cylindrical engagement portion.

22. The support pedestal as recited in claim 10, further comprising a second coupling member operatively coupling the support member to the base member.

23. The support pedestal as recited in claim 10, wherein the cylindrical base extension comprises a third locking member that is disposed on the cylindrical base extension wall and the first cylindrical engagement portion comprises a fourth locking member.

24. A method of elevating a portion of a building surface above a fixed surface using a pedestal comprising a base member, a support member, and a coupling member, the method comprising: positioning the base member on a fixed surface where the base member includes a base extension wall extending upwardly and defining a base member bore and having base member threads disposed on an outer surface of the base extension wall; slidably and linearly inserting a first cylindrical engagement portion of the coupling member into the base member such that the coupling member is inhibited from rotating relative to the base member and a second cylindrical engagement portion wall of the coupling member is in load-bearing contact with the base extension wall, the second cylindrical engagement portion wall comprising coupling member threads wherein the coupling member threads are operatively synchronized with the base member threads; and rotating the support member relative to the coupling member into threaded engagement with the coupling member.

25. The method as recited in claim 24, wherein the rotating step further comprises:

continuing to rotate the support member relative to the coupling member so that the support member is in concurrent threaded engagement with both the coupling member and the base member.

26. The method as recited in claim 24, wherein the slidably and linearly inserting step further comprises:

inhibiting the coupling member from vertical movement relative to the base member.

27. The method as recited in claim 24, further comprising the step of slidably inserting a second coupling member into a bore formed in the second cylindrical engagement portion before rotating the support member into threaded engagement with the coupling member.

28. A support pedestal, comprising: a base member comprising a base plate that is adapted to be placed upon a surface; a cylindrical base extension extending upwardly from the base plate, the cylindrical base extension comprising a cylindrical base extension wall having an inner diameter and an outer diameter and a base member bore defined by the inner diameter and base member threads disposed on the outer diameter of the cylindrical base extension wall; a coupling member, the coupling member comprising a first cylindrical engagement portion that is configured to be slidably and linearly engaged with the base member bore, and a second cylindrical engagement portion having an outer diameter that is greater than the outer diameter of the first cylindrical engagement portion and having coupling member threads disposed thereon, where the second cylindrical engagement portion wall is placed in load-bearing contact with the base extension wall such that the coupling member threads are operatively synchronized with the base member threads; and a support plate disposed over the coupling member.

29. A support pedestal as recited in claim 28, further comprising a first locking member disposed on the cylindrical base extension wall and a second locking member disposed on the first cylindrical engagement portion, wherein the first and second locking members are adapted to engage to inhibit axial movement of the coupling member relative to the base member.

30. The support pedestal as recited in claim 1, wherein the outer surface of the first cylindrical engagement portion wall is non-threaded.

31. The support pedestal as recited in claim 10, wherein the first cylindrical engagement portion is configured to be slidably and linearly inserted into the first pedestal member bore.

32. The support pedestal as recited in claim 30, wherein the first cylindrical engagement portion is configured to be slidably and linearly inserted into the first pedestal member bore.

* * * * *